United States Patent
Kramer et al.

(10) Patent No.: US 11,985,734 B2
(45) Date of Patent: May 14, 2024

(54) COUNTERTOP COOKING SYSTEM

(71) Applicant: SharkNinja Operating LLC, Needham, MA (US)

(72) Inventors: Ethan S. Kramer, Allston, MA (US); Abhilash Shah, Bedford, NH (US); Ethan T. Brown, Cambridge, MA (US); Joshua D. Anthony, Billerica, MA (US); Linden Zlotea, Jamaica Plain, MA (US)

(73) Assignee: SharkNinja Operating LLC, Needham, MA (US)

( * ) Notice: Subject to any disclaimer, the term of this patent is extended or adjusted under 35 U.S.C. 154(b) by 80 days.

(21) Appl. No.: 17/385,238

(22) Filed: Jul. 26, 2021

(65) Prior Publication Data
US 2022/0030666 A1 Jan. 27, 2022

Related U.S. Application Data

(60) Provisional application No. 63/056,974, filed on Jul. 27, 2020.

(51) Int. Cl.
*H05B 1/02* (2006.01)
*A47J 36/32* (2006.01)
(Continued)

(52) U.S. Cl.
CPC ............ *H05B 1/0263* (2013.01); *A47J 36/32* (2013.01); *A47J 37/0629* (2013.01);
(Continued)

(58) Field of Classification Search
CPC .... A47J 37/0641; A47J 36/32; A47J 37/0629; H05B 1/0263; F24C 14/02; F24C 7/046; F24C 7/067
See application file for complete search history.

(56) References Cited

U.S. PATENT DOCUMENTS 3,569,656 A 3/1971 White et al.
3,984,578 A * 10/1976 Rohrl .................... F24C 15/325
426/523
(Continued)

FOREIGN PATENT DOCUMENTS

WO 2020049314 A2 3/2020

OTHER PUBLICATIONS

Extended European Search Report for EP Patent Application 21187991.1, mailed on Jan. 4, 2022, 9 pages.
(Continued)

*Primary Examiner* — Thien S Tran
(74) *Attorney, Agent, or Firm* — Mintz, Levin, Cohn, Ferris, Glovsky and Popeo, P.C.

(57) ABSTRACT

A cooking system positionable on a support surface includes a housing having a hollow chamber including an internal cooking chamber for receiving a food item, at least one radiative heating element arranged within the hollow interior and operable to heat said cooking chamber and a convection heater disposed within the hollow chamber and operable to heat the cooking chamber. The cooking system is operable in a convection cooking mode and during the convection cooking mode, the at least one radiative heating element is selectively energized.

19 Claims, 10 Drawing Sheets

(51) Int. Cl.
  *A47J 37/06* (2006.01)
  *F24C 7/04* (2021.01)
  *F24C 7/06* (2006.01)
  *F24C 7/08* (2006.01)
  *F24C 15/32* (2006.01)

(52) U.S. Cl.
  CPC ........... *A47J 37/0641* (2013.01); *F24C 7/046* (2013.01); *F24C 7/067* (2013.01); *F24C 7/087* (2013.01); *F24C 15/325* (2013.01)

(56) References Cited

U.S. PATENT DOCUMENTS

| | | |
|---|---|---|
| 4,191,881 A | 3/1980 | Ahlgren et al. |
| 4,374,319 A | 2/1983 | Guibert |
| 6,576,140 B1 | 6/2003 | Batten |
| 8,748,783 B2 | 6/2014 | Hensel et al. |
| 10,502,430 B1* | 12/2019 | Alvey .................... F24C 7/062 |
| 2004/0154613 A1 | 8/2004 | Han et al. |
| 2007/0145043 A1 | 6/2007 | Morrow et al. |
| 2009/0064984 A1* | 3/2009 | Kuhne ................. F24C 15/322 |
| | | 126/21 A |
| 2016/0327280 A1* | 11/2016 | Smith ..................... F24C 7/087 |
| 2016/0331175 A1* | 11/2016 | Johncock ............. A47J 37/049 |
| 2020/0187697 A1 | 6/2020 | Stewart et al. |
| 2020/0229639 A1* | 7/2020 | Swayne ............. A47J 37/0641 |

OTHER PUBLICATIONS

International Search Report and written opinion for International Patent Application No. PCT/US2021/43186, mailed on Nov. 3, 2021, 10 pages.

\* cited by examiner

COUNTERTOP COOKING SYSTEM

CROSS REFERENCE TO RELATED APPLICATION

This application claims the benefit to U.S. Provisional Application No. 63/056,974 filed on Jul. 27, 2020, entitled "Countertop Cooking System," which is hereby incorporated herein by reference in its entirety.

FIELD

Embodiments of the present disclosure relate generally to a cooking system, and more particularly, to a countertop cooking system capable of performing several different cooking operations.

BACKGROUND

Existing countertop cooking systems, such as toaster ovens for example, may be used to conveniently warm or cook food in place of a larger wall mounted oven or a range for example. Such ovens that do not cook via forced convection can be limited in their cooking applications, such as an ability to evenly cook multiple layers of food without moving the food during the cooking cycle. This is because the top layer receives radiation from one or more heating elements at the top of the cooking system and the bottom layer receives radiation from one or more heating elements at the bottom of the cooking system. However, the middle area between the top and bottom layers receives less radiation, and therefore is cooked more slowly and less evenly.

Some existing countertop cooking systems solve this problem of unequal heating by circulating air through the oven via a fan. Although such systems result in more even cooking, the fan typically used in these convection systems is small and low power; the oven is generally not designed to evenly distribute the air across the full oven.

During a cooking operation, grease, fat or other food byproducts may drip or splatter onto the radiative heating elements. In instances where the radiative heating elements are operational, the heating elements will burn off the grease during the cooking cycle. However, in a cooking mode where heat generation is performed by another heating element, such as a convective heating element, grease or fat can accumulate on the cool radiative heating elements. The next time that the cooking system is used to perform a cooking operation using the radiative heating elements, significant smoke generation may occur as a result of the accumulated grease and fat. This unexpected smoke generation may result in user perception of a malfunctioning unit.

SUMMARY

According to an embodiment, a cooking system positionable on a support surface includes a housing having a hollow chamber including an internal cooking chamber for receiving a food item, at least one radiative heating element arranged within the hollow interior and operable to heat said cooking chamber and a convection heater disposed within the hollow chamber and operable to heat the cooking chamber. The cooking system is operable in a convection cooking mode and during the convection cooking mode, the at least one radiative heating element is selectively energized.

In addition to one or more of the features described above, or as an alternative, in further embodiments a cooking cycle of said convection cooking mode includes at least one convection cooking segment during which said convection heater is energized, and at least one pulsing segment during which said at least one radiative heating element is energized.

In addition to one or more of the features described above, or as an alternative, in further embodiments said convection heater includes a convective heating element, and during said at least one pulsing segment, said convective heating element is de-energized.

In addition to one or more of the features described above, or as an alternative, in further embodiments said convection heating system further includes an air movement device and a convective heating element for heating an air flow moved by said air movement device, and during said at least one pulsing segment said air movement device is energized, while said convective heating element is de-energized.

In addition to one or more of the features described above, or as an alternative, in further embodiments during said at least one pulsing segment, a power provided to said at least one radiative heating element is less than a full power associated with operation of said at least one radiative heating element.

In addition to one or more of the features described above, or as an alternative, in further embodiments during said at least one pulsing segment, said at least one radiative heating element is operated at about 50% of said full power.

In addition to one or more of the features described above, or as an alternative, in further embodiments a time of said at least one pulsing segment is shorter than a time of said at least one convection cooking segment.

In addition to one or more of the features described above, or as an alternative, in further embodiments said at least one pulsing segment occurs at a predetermined interval within said cooking cycle.

In addition to one or more of the features described above, or as an alternative, in further embodiments said at least one pulsing segment is initiated in response to a detection of a sensed condition.

In addition to one or more of the features described above, or as an alternative, in further embodiments said sensed condition includes accumulation of a food byproduct on said at least one radiative heating element.

In addition to one or more of the features described above, or as an alternative, in further embodiments a power delivered to said at least one radiative heating element during a pulsing segment is less than a power delivered to said convection heater during said convection cooking segment.

In addition to one or more of the features described above, or as an alternative, in further embodiments a time of said pulsing segment is less than a time of said convection cooking segment.

In addition to one or more of the features described above, or as an alternative, in further embodiments said convection cooking segment is approximately three times as long as a pulsing segment.

In addition to one or more of the features described above, or as an alternative, in further embodiments said at least one radiative heating element includes a first radiative heating element arranged adjacent a ceiling of said cooking chamber and a second radiative heating element arranged adjacent a floor of said cooking chamber.

In addition to one or more of the features described above, or as an alternative, in further embodiments during said convection cooking mode, said second radiative heating element is selectively energized to clean said second radiative heating element.

In addition to one or more of the features described above, or as an alternative, in further embodiments during said convection cooking mode, both said first radiative heating element and said second radiative heating element are selectively energized clean said second radiative heating element.

In addition to one or more of the features described above, or as an alternative, in further embodiments said convection heating system is located remotely from said internal cooking chamber.

In addition to one or more of the features described above, or as an alternative, in further embodiments said hollow interior includes a convective chamber in fluid communication with said cooking chamber, said convection heating being arranged within said convective chamber.

In addition to one or more of the features described above, or as an alternative, in further embodiments comprising a fan shroud mounted within said hollow interior, wherein said fan shroud forms a partition that separates said cooking chamber and said convective chamber.

In addition to one or more of the features described above, or as an alternative, in further embodiments the cooking system is operable in a radiative cooking mode.

In addition to one or more of the features described above, or as an alternative, in further embodiments in the radiative cooking mode, only the at least one radiative heating element is energized.

In addition to one or more of the features described above, or as an alternative, in further embodiments the cooking system has a maximum power of 1800 W.

BRIEF DESCRIPTION OF THE FIGURES

The accompanying drawings incorporated in and forming a part of the specification embodies several aspects of the present disclosure and, together with the description, serves to explain the principles of the disclosure. In the drawings.

The detailed description explains embodiments of the disclosure, together with advantages and features, by way of example with reference to the drawings.

DETAILED DESCRIPTION

Figure 1:
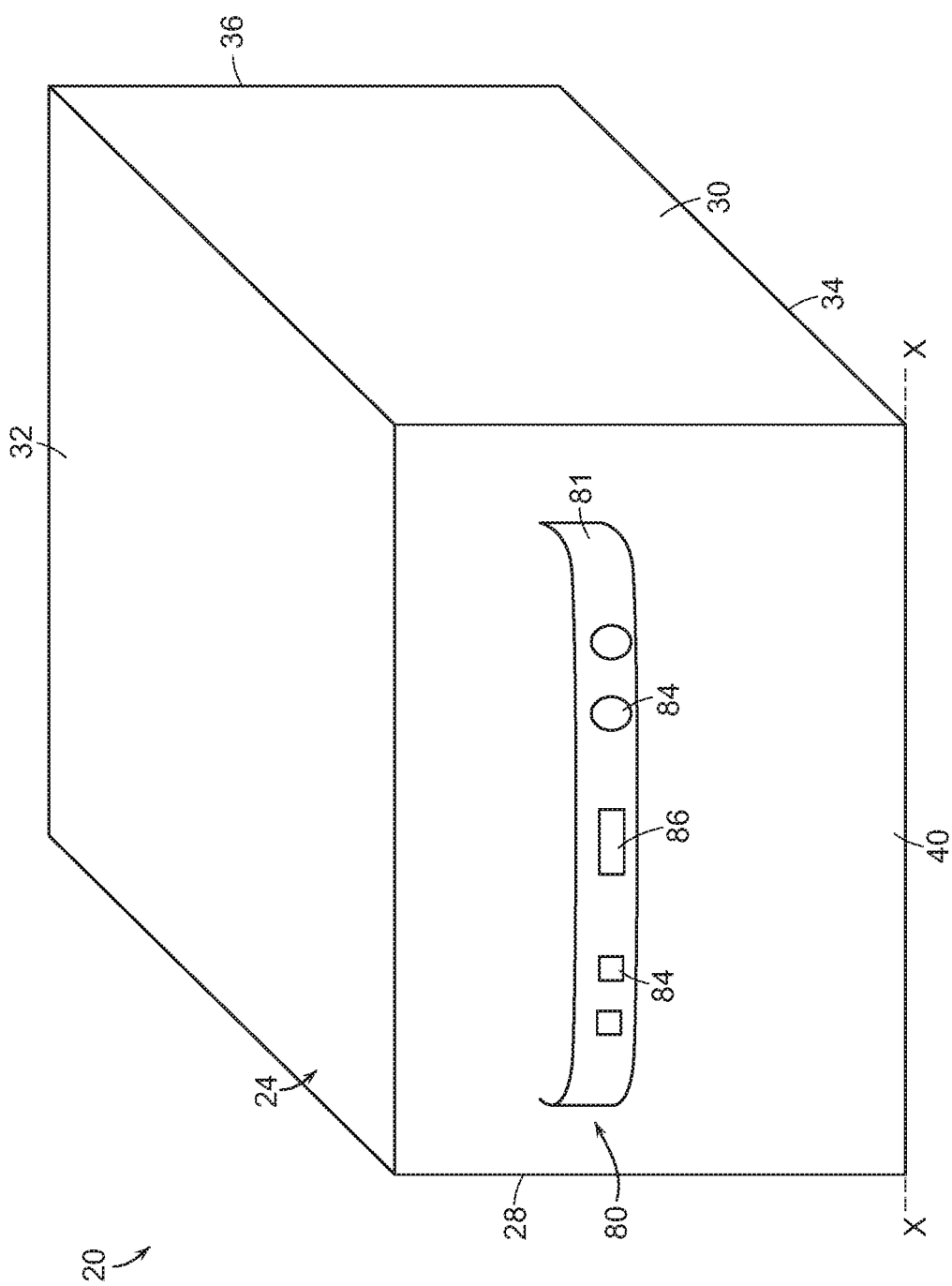
FIG. 1 is a front perspective view of a cooking system according to an embodiment.
Figure 2:
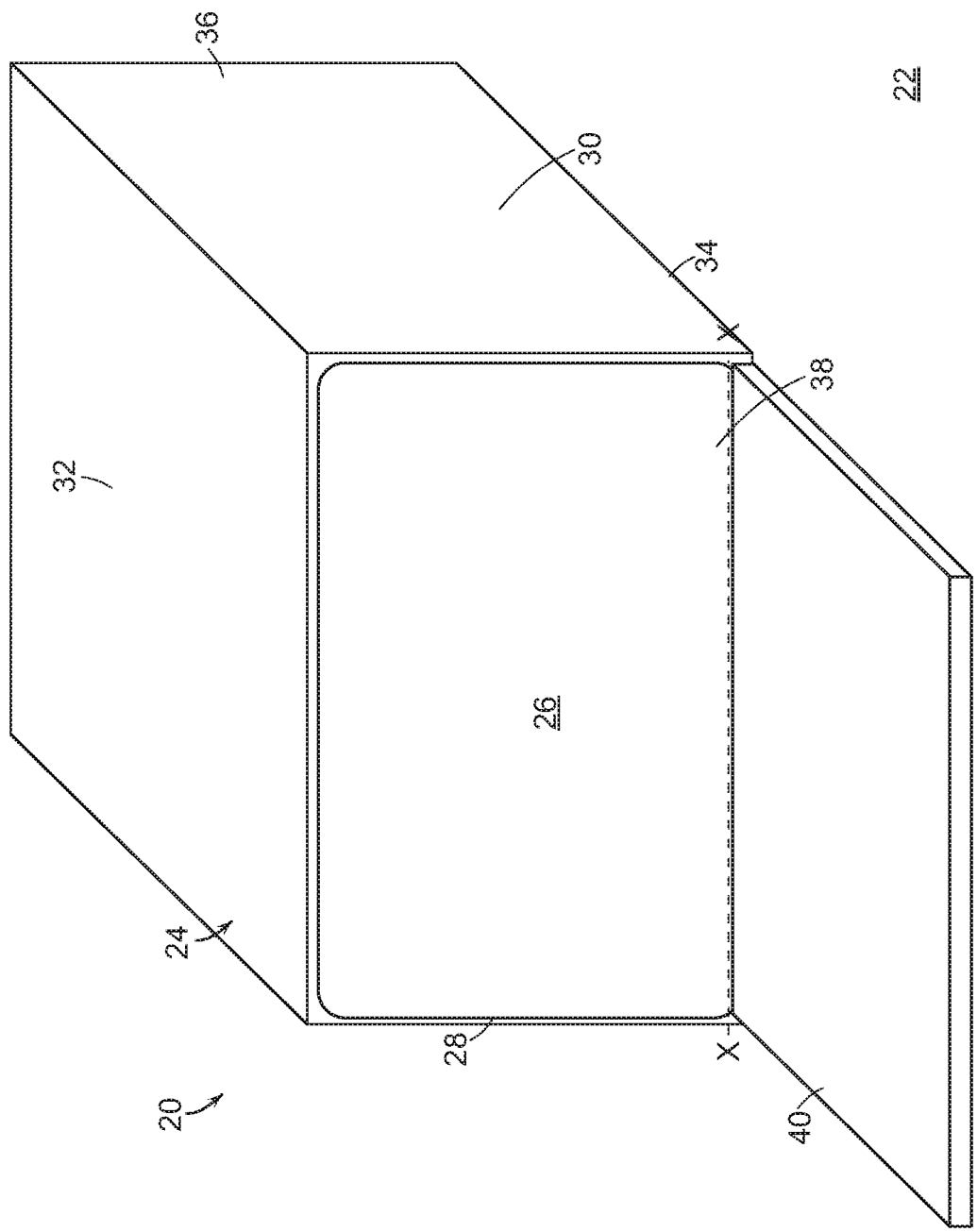
FIG. 2 is a front perspective view of a cooking system with a door in an open position according to an embodiment.

With reference now to the FIGS. 1 and 2, an example of a cooking system 20 suitable for use on a support surface 22, such as a countertop for example, is illustrated. The cooking system 20 includes a thermally insulated housing 24 that defines a generally hollow chamber 26. In the illustrated, non-limiting embodiment, the housing 24 includes a left sidewall 28, a right sidewall 30, a top 32, a bottom 34, and a back or rear wall 36 connected together to define the chamber 26 there between. In an embodiment, relatively front ends of the side, top, and bottom walls define an access opening 38 (see FIG. 2) through which the chamber 26 is accessed by a user. However, it should be understood that embodiments where the housing 24 includes a relatively small front wall extending from one or more of the side, top, and bottom walls and defining a portion of the opening 38 are also within the scope of the disclosure.

In an exemplary embodiment, the housing 24 includes a door 40 that is hinged along the bottom wall 34 or lower portions of the side walls 28, 30, and movable relative to the remainder of the housing 24 to selectively provide access to the chamber 26 through the opening 38. As shown in the illustrated, non-limiting embodiment, the door 40 includes a transparent panel and is rotatable about a hinge axis X between an open position (FIG. 2) and a closed position (FIG. 1). Although the hinge axis X is illustrated as being located at bottom of the door 40, adjacent the bottom wall 34, embodiments where the hinge axis is defined at another portion of the housing 24, such as along the left sidewall 28 or the right sidewall 30 of the housing 24 for example, are also within the scope of the disclosure. Further, although the door 40 is described as being pivotable about a hinge axis X, it should be understood that embodiments where the door 40 is configured to translate relative to the housing 24, or where the door 40 is removably coupled to the housing 24 are also contemplated herein.

Figure 3:
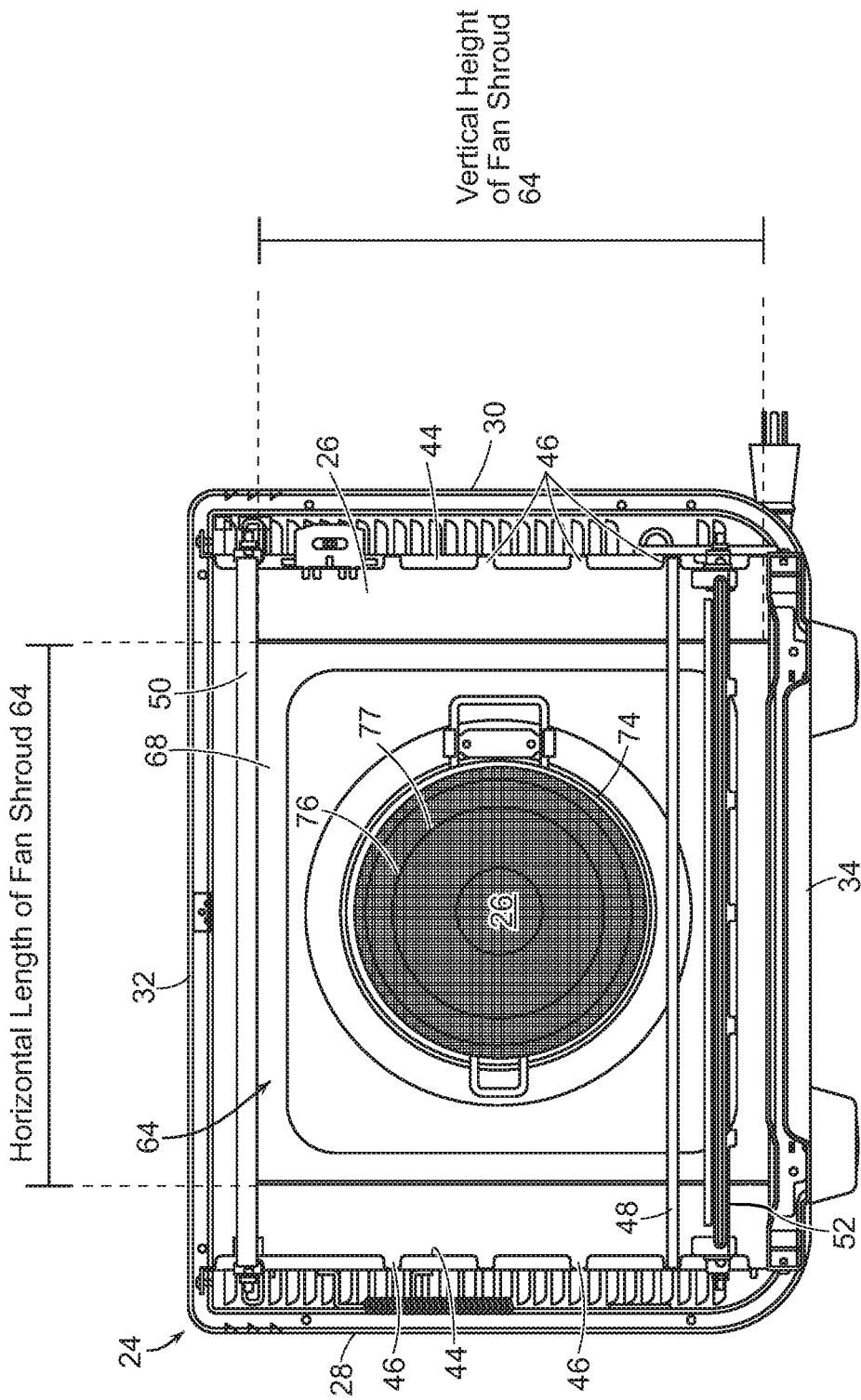
FIG. 3 is a front view of an interior of a cooking system according to an embodiment.
Figure 4:
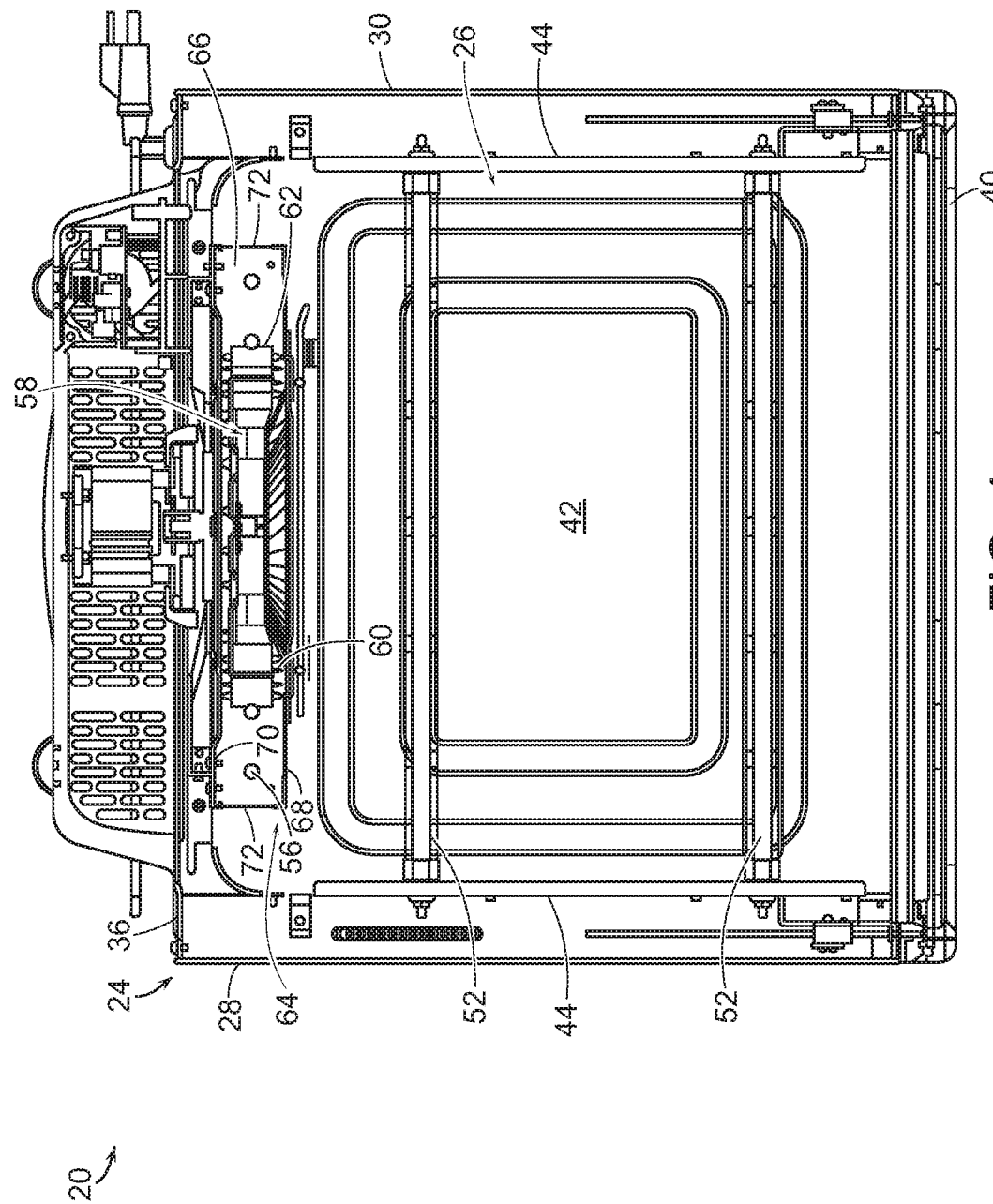
FIG. 4 is a top plan view of an interior of a cooking system according to an embodiment.
Figure 5:
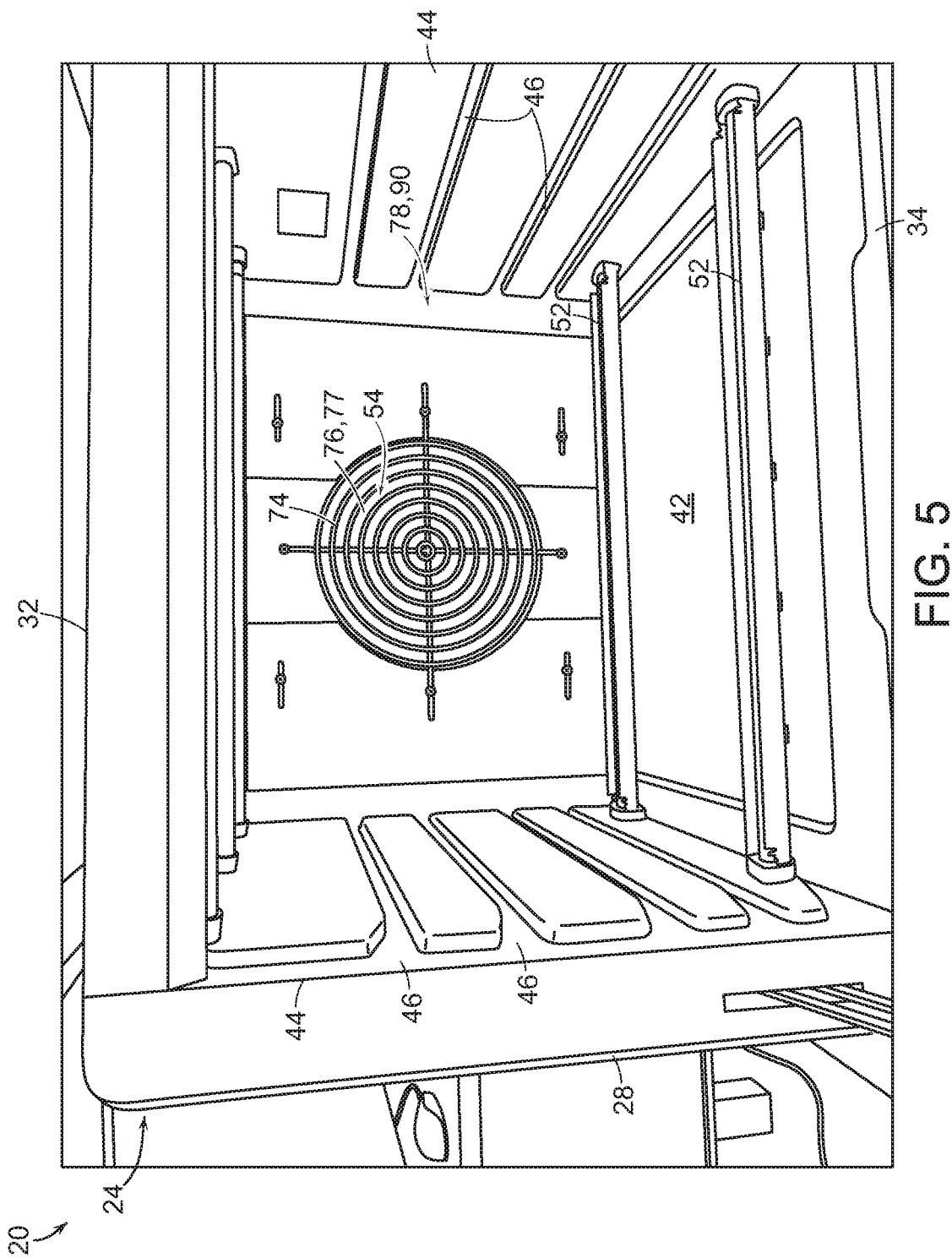
FIG. 5 is a front view of an interior of a cooking system according to an embodiment.
Figure 6:
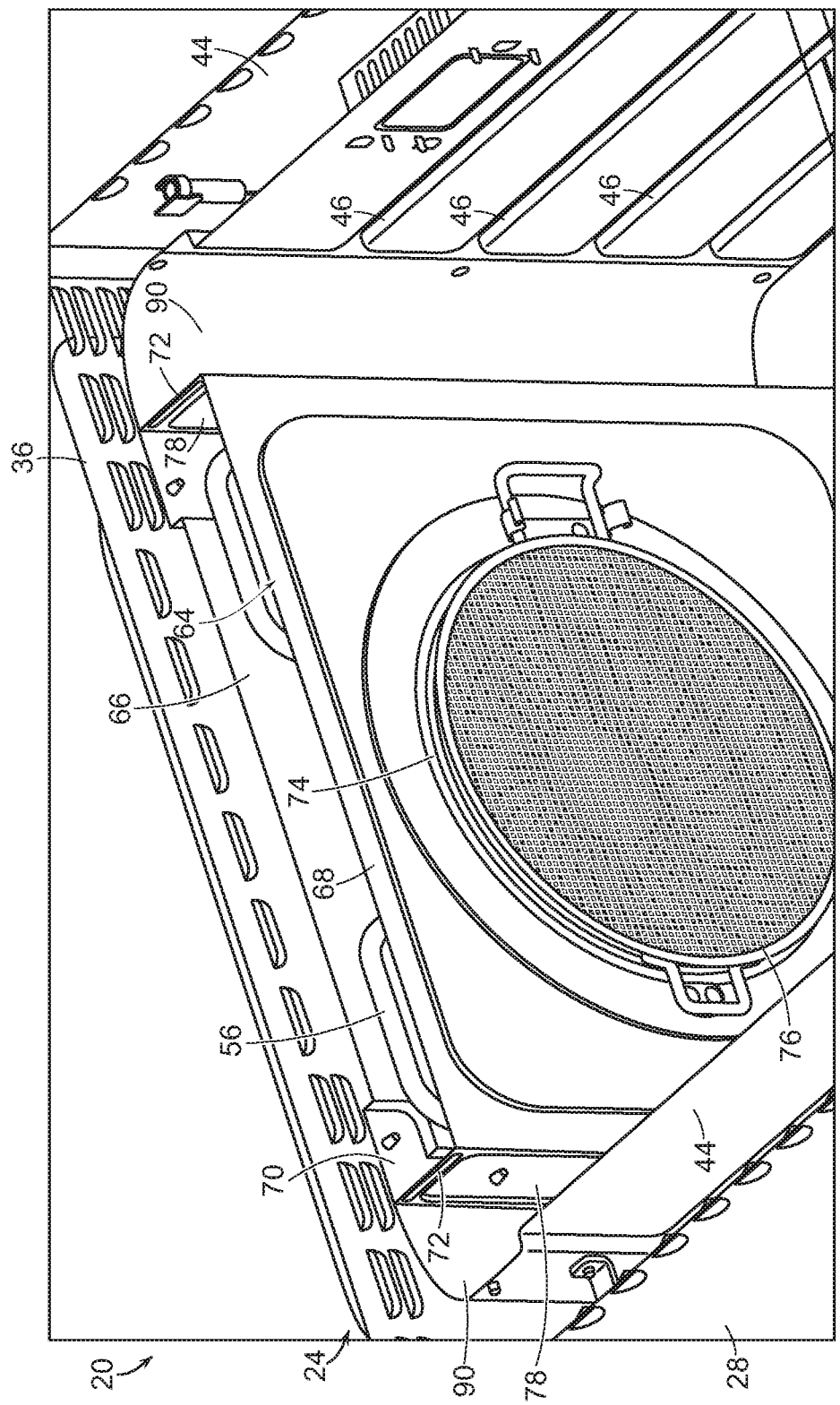
FIG. 6 is a perspective view of an interior of a cooking system according to an embodiment.

In some embodiments, as shown in FIGS. 1 and 2, the door 40 may extend between and abut against the side walls 28, 30, the top wall 32 and the bottom wall 34 to cover the entire opening 38 when closed. Alternatively, in other embodiments, the door 40 may cover or seal only a portion of the opening 38. In such embodiments, a front wall (not shown) of the housing 24 may also cover a portion of the opening 38 such that the front wall and the door when closed cooperate to seal the opening 38. cooking chamber With reference now to FIG. 3, defined within the chamber 26 of the housing 24 is a cooking chamber 42, within which one or more food items are positionable via opening 38 to perform a cooking operation. Arranged within the cooking chamber 42 may be at least one fixture 44. In the illustrated, non-limiting embodiment, a pair of opposing fixtures 44 are mounted to or are integrally formed with an interior surface of the left sidewall 28 and the right sidewall 30, respectively. As shown, the one or more fixtures 44 may define a plurality of mounting surfaces 46, such as slots for example, arranged at different positions relative to the height of the cooking chamber 42. The mounting surfaces 46 defined by the fixtures 44 may be used to support one or more cooking accessories 48, such as a removable cooking rack, basket, spit, or drip tray for example, at a desired position within the cooking chamber 42.

In operation, the cooking chamber 42 is heated by at least one heating element. In an embodiment, the cooking system 20 includes one or more first heating elements 50 positioned within the chamber 26, and more specifically, within the cooking chamber 42, for example adjacent the top 32 of the housing 24. In the illustrated, non-limiting embodiment, the cooking system 20 includes a plurality of first heating elements 50, such as three first heating elements for example, extending generally between the left sidewall 28 and the right sidewall 30, and spaced across a depth of the top 32 of the housing 24. It should be understood that any number of first heating elements 50 and any configuration of the first heating elements 50 are contemplated herein. Alternatively, or in addition, at least one second heating element 52 may be positioned within the cooking chamber 42, for example adjacent the bottom 34 of the housing 24. In the illustrated, non-limiting embodiment of FIG. 3, the cooking system 20 includes a plurality of second heating elements 52, such as two second heating elements for example, extending generally between the left sidewall 28 and the right sidewall 30, and spaced across a depth of the bottom 34 of the housing 24. The first heating elements 50 and the second heating elements 52 may be generally vertically aligned, or may be staggered relative to one another.

In the illustrated, non-limiting embodiment, both the first and second heating elements 50, 52 are infrared heating elements operable to heat the cooking chamber 42 via radiation. However, the one or more heating elements 50, 52 of the cooking system 20 may be selected to perform any suitable type of heating, including but not limited to, radiation, conduction, natural convection, and induction. Accordingly, the at least one heating element 50, 52 may be any type of heating element, such as a tubular, quartz, tungsten, or halogen heating element. At least one of the first and second heating elements 50, 52 is operable in a first cooking mode to perform one or more cooking operations. Examples of cooking operations that may be performed in the first cooking mode include, but are not limited to toasting, baking, broiling, grilling, warming and reheating for example. It should be understood that although the heating elements 50, 52 of the cooking system 20 are illustrated and described as being positioned generally adjacent the top 32 and bottom 34 of the housing 24, embodiments where the cooking system 20 alternatively or additionally includes one or more heating elements (not shown) located adjacent a side of the cooking chamber 42, or within a center of the cooking chamber 42 are also contemplated herein.

Further, it should be understood that in embodiments of the cooking system 20 having a plurality of heating elements 50, 52 arranged at multiple locations within the cooking chamber 42, the plurality of heating elements 50, 52 may be substantially identical, or alternatively, may be different, and further may be operable to perform similar or distinct types of heating.

In an embodiment, best shown FIGS. 4-7, the cooking system 20 includes a convection heater 54 selectively operable to impart the heat to cooking chamber 42 during at least one mode of operation of the cooking system 20. The convection heater 54 may be positioned near an interior surface of the rear wall 36 of the housing 24. However, embodiments where the convection heater 54 is disposed adjacent another wall of the housing 24 are also contemplated herein. The convection heater 54 includes at least one convective heating element 56 configured to heat air as it passes over the one convective heating element 56 via an air movement device 58, such as a fan for example.

In an embodiment, an inlet 60 of the air movement device 58 is arranged at a first, generally planar surface of the air movement device 58, facing the cooking chamber 42, and an outlet 62 of the air movement device 58 is arranged about an outer periphery of the body of the air movement device 58. Accordingly, in an embodiment, the air movement device 58 is a radial fan operable to receive an axial airflow and exhaust the airflow radially outward. In such embodiments, the convection heater 54 may be mounted concentrically with the air movement device 58 such that the air output from the fan 58 passes over at least a portion of the convection heater 54 before returning to the cooking chamber 42. However, embodiments where the convection heater 54 is arranged at another location relative to the air movement device 58, for example just in front (upstream) from the inlet 60 of the air movement device 58, are also within the scope of the disclosure.

In an embodiment, the cooking system 20 includes a fan shroud 64 mounted adjacent the convective heating system. As shown, the fan shroud 64 is arranged adjacent the interior surface of the back wall 36 of the housing 24. The fan shroud 64 generally defines a convecting chamber 66 within the interior of the housing chamber 26 of the housing 24, separate from the cooking chamber 42, and within which the convection heater 54 is located.

In the illustrated, non-limiting embodiment, the fan shroud 64 includes a first wall 68 and a second wall 70 separated from one another by distance, and two sides 72 extending between and coupling the first wall 68 and the second wall 70. In embodiments of the fan shroud 64 including both a first and second wall 68, 70, the second wall 70 may be mounted directly to an interior surface of a wall of the housing 24, such as the back wall 36 of the housing 24 for example, or alternatively, may be mounted at a position offset from the interior surface of the wall of the housing 24. However, embodiments where the fan shroud 64 includes only a first wall 68 with or without sides 72 (with the back wall 36 effectively serving as the second wall 70) are also within the scope of the disclosure. Indeed, the fan shroud 64 may be formed from a single piece of material, such as via a bending and welding operation for example, or alternatively, the fan shroud 64 may include multiple pieces permanently or removably connected together, with the piece or pieces of material extending vertically across a relative rear of the chamber 26 from the top wall 32 to the bottom wall 34. In an embodiment, the fan shroud 64 is formed from a metal material. However, it should be understood that any suitable material capable of withstanding the operating temperatures of the cooking system 20 is within the scope of the disclosure.

The first wall 68 of the fan shroud 64 forms a partition that separates the chamber 26 of the housing 24 into a cooking chamber 42 and the convecting chamber 66. The convecting chamber 66 is arranged in fluid communication with the cooking chamber 42 via the sides 72 of the fan shroud 64. The front of the convecting chamber 66 is defined by a surface of the first wall 68 of the fan shroud 64 and a back of the convecting chamber 66 may be defined by either the second wall 70 of the fan shroud 64, or alternatively in embodiments where the fan shroud 64 does not include a second wall 70, by the interior surface of the back wall 36 of the housing 24. As shown, the cooking chamber 42 extends between a surface of the front wall 68 the fan shroud 64, and the interior surfaces of the left and right sidewalls 28, 30, the top wall 32, the bottom wall 34, and the door 40.

A through hole 74 is formed in the fan shroud, such as in the first wall 68 for example, to define an inlet to convection heater 54 and the convecting chamber 66. The inlet 60 of the air movement device 58 may be positioned generally adjacent the through hole 74. In an embodiment, the through hole 74 may be generally equal to a diameter of the air movement device 58. However, in other embodiments, the through hole 74 may be smaller than the diameter of the air movement device 58. Further, in an embodiment, a guard 76 may be positioned in overlapping arrangement with the through hole 74. Inclusion of the guard 76 is intended to prevents food entrained within the air flow from being drawn into the fan and/or provided to the convection heater 54. The guard 76 may include a body formed from at least one layer of material 77. In the illustrated, non-limiting embodiment, the body includes a plurality of overlapping layers of material. However, it should be understood that a guard 76 including only single layer of material, or alternatively, more than two layers of material are also within the scope of the disclosure. Further, embodiments of the cooking system 20 that do not include a guard 76 adjacent the through hole 74 are also contemplated herein.

The at least one layer 77 of the guard 76 is permeable to air and water vapor. The layer 77 may be selected from any suitable heat-resistant material. In an embodiment, the material used to form one or more of the layers 77 of the guard is a non-absorbent material, such as a metal wire mesh for example. The configuration of the mesh, such as the size of the apertures of the mesh for example, is selected such that projectile matter generated during a cooking operation, such as fat or oil for example, is substantially blocked from passage through the apertures. However, the sizes of the apertures may also be selected to allow a flow of air and heat, sufficient for performing a convective cooking operation for example, to pass through the material In the illustrated, non-limiting embodiment, at least the first wall 68 (and possibly also the second wall 70) of the fan shroud 64 includes a lesser horizontal length than the back wall 36 of the housing 24. As a result, the sides 72 of the fan shroud 64 are offset from the interior surfaces of the left and right sidewalls 28, 30, respectively. Further, the fan shroud 64 may extend vertically from adjacent the interior surface of the top wall 32 to the interior surface of the bottom wall 34 of the housing 24, also referred to herein as the ceiling and floor of the interior of the housing 24. Alternatively, the fan shroud 64 may extend vertically from adjacent a heating element 50 to the interior surface of the bottom wall 34.

One or more openings 78 are formed at each lateral side 72 of the fan shroud 64 to define an outlet of the convecting chamber 66. The outlet of the convecting chamber 66 may extend generally perpendicularly between the first and second walls 68, 70, or may be arranged at an angle there between. In an embodiment, a single opening 78 extends over substantially the entire height of the fan shroud 64. However, in other embodiments, a plurality of distinct openings 78, separated from one another by portions of the side 72, may be formed over substantially the height of the fan shroud 64.

In an embodiment, the width of the openings 78 of the fan shroud 64 are optimized to raise the pressure within the convecting chamber 66 without negatively impacting the overall air flow rate. As a result, the heated air flow is forced out of the openings 78 at the sides 72 of the fan shroud evenly over the height of the interior of the housing 24. Additionally, the fan shroud 64 is designed to reduce the spin applied to the air by the air movement device which reduces the presence of localized hot spots within the cooking chamber 42. Further, inclusion of the fan shroud 64 increases the distance between the inlet 60 and the outlet of the air movement device 58 and facilitates maintenance of a sufficiently high velocity of the airflow at the outlet in a direction away from the inlet 60. This reduces the likelihood of "short circuiting" where air provided at the outlet 62 of the air movement device 58 is quickly sucked back into the inlet 60 instead of circulating through the cooking chamber 42.

Figure 7:
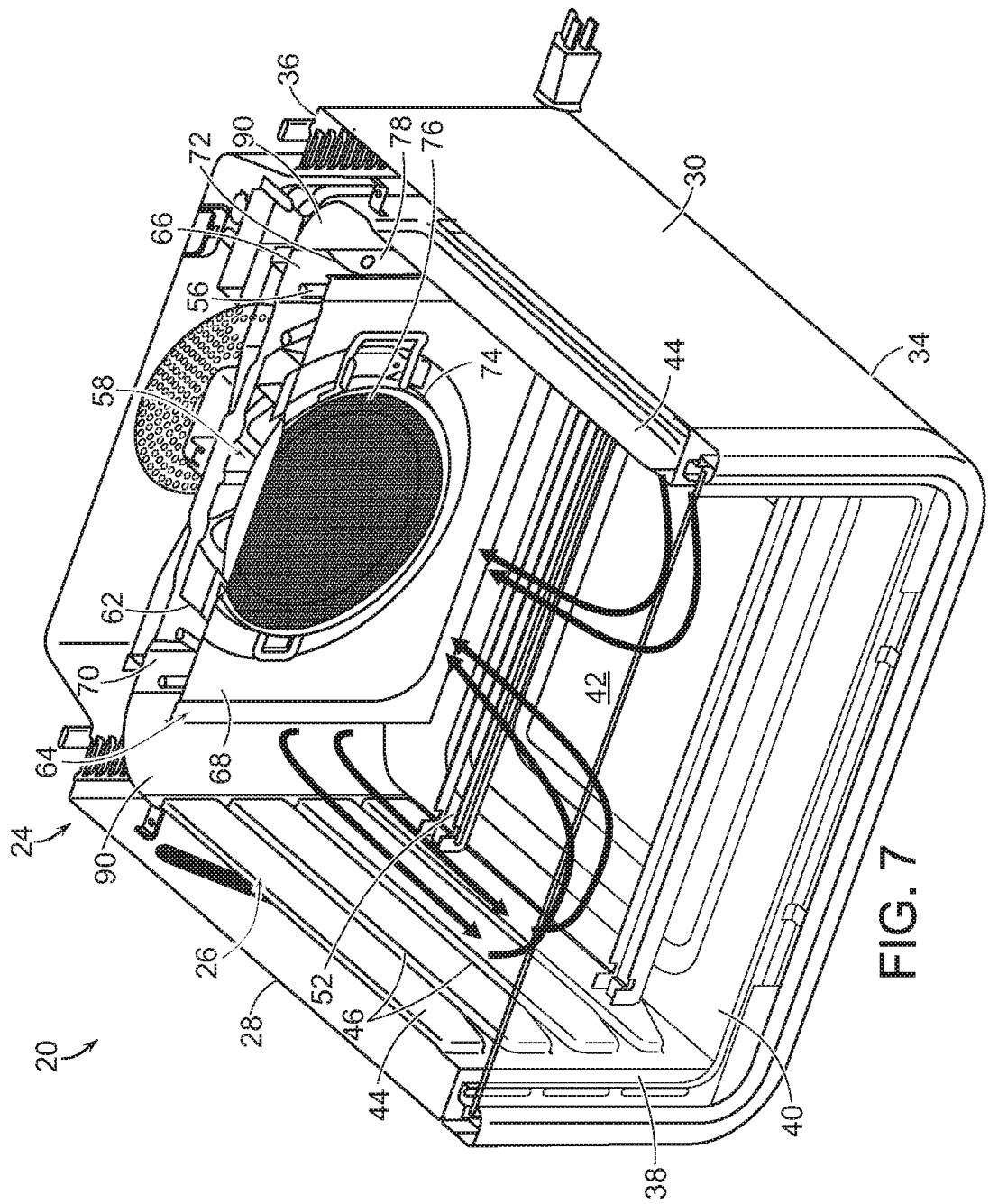
FIG. 7 is a detailed perspective view of a portion of an interior of a cooking system according to an embodiment.

In use, the convection heater 54 moves air through the housing chamber 26 (from the convecting chamber 66 to the cooking chamber 42 and back) as shown in FIG. 7. Rotation of the air movement device 58 draws air axially, via the through hole 74 formed in the fan shroud 64, to the inlet 60 and expels the air radially outwardly, causing the air to flow over the convective heating element 56. As the air moves across the convective heating element 56, the air is heated. The air is then output from the convecting chamber 66 via the openings 78 formed at the sides 72 of the fan shroud 64. Because the openings 78 extend generally over the full height of the fan shroud 64, and therefore generally between the floor and ceiling of the housing 24, a uniform, curtain like-flow of heated air flow is output from the convecting chamber 66.

Arranged directly adjacent at least one side 72 of the fan shroud 64 or the lateral edge # of the first wall 68 if no sides 72 are present, extending generally between the fan shroud 64 and the interior surface of the adjacent sidewall 28, 30 is a deflecting vent or guide 90. The guides 90 extend from or along the second wall 70 of the fan shroud 64 or the rear wall 36 of the housing 24. Accordingly, these guides effectively form a portion of the rear of both the housing chamber 26 and the convecting chamber 66. In the exemplary embodiment shown in the Figures, the guides 90 extend at least from the openings 78 to the fixtures 44. The guides 90 may be a separate component, or alternatively, may be integrally formed with one or more of the walls of the housing 24, the fan shroud 64, and/or the fixture 44. A contour of the guide 90 is selected to smoothly direct the air output from the convecting chamber 66 toward the cooking chamber 42 as shown via arrows in FIG. 7. Although the guide 90 is illustrated as having a generally arcuate contour extending from immediately adjacent the openings 78, it should be understood that a guide having any suitable shape is within the scope of the disclosure.

The openings or vents 78 that extend generally between the floor and the ceiling of the interior of the housing 24 generate a more even distribution of airflow between the top and bottom and left and right of the cooking chamber 42. As a result, more even cooking occurs within the cooking chamber 42, thereby eliminating the need for a user to reposition food within the cooking chamber 42 during a cooking operation.

From the guide 90, the air flow output from the convecting chamber 66 is directed along the interior surfaces of the sidewalls 28, 30 or fixtures 44, within the cooking chamber 42, towards the door 40. This curtain of hot air extending between the interior surfaces of the top and bottom walls 32, 34 of the housing 24 is configured to deflect off the door 40 and is drawn toward the center of the cooking chamber 42 by the air movement device 58 as shown via the arrows.

With reference again to FIG. 1, a control panel or user interface 80 for operating the cooking system 20 is mounted to an exterior portion of the housing 24, for example to a handle 81 extending from the door 40. The control panel 80 is part of a control system 82 (see FIG. 8) that is electrically connected to the one or more heating elements 50, 52 and the convection heater 54. The control panel 80 includes one or more inputs 84 associated with energizing the one or more heating elements 50, 52 and the convection heater 54 of the cooking system 20 and for selecting various modes of operation of the cooking system 20. One or more of the inputs 84 may include a light or other indicator to show that the respective input 84 has been selected. The control panel 80 may additionally include a display 86 separate from and associated with the at least one input 84. However, embodiments where the display 86 is integrated into the at least one input 84 are also contemplated herein.

Figure 8:
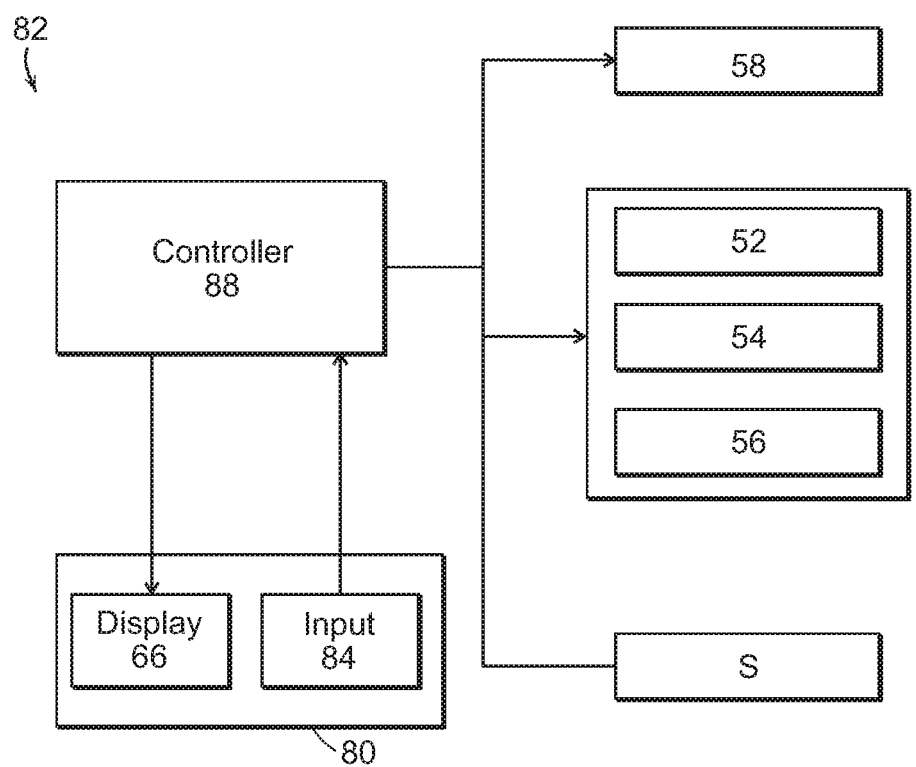
FIG. 8 is a schematic diagram of a control system of the cooking system according to an embodiment.

Operation of the one or more inputs 84 will be described in more detail below. As shown in FIG. 8, the control system 82 includes a controller or processor 88 for controlling operation of the heating elements 50, 52 and the convection heater 54, in response to a user input provided via the one or more inputs 84 and for using algorithms to execute stored sequences of heating operation. In embodiments where the cooking system 20 includes a plurality of heating elements 50, 52 and the convection heater 54, the heating elements 50, 52 and the convection heater 54, may be independently operable. Further, the heating output of one or more of the heating elements 50, 52 and the convection heater 54 may be variable in response to the power supplied to the heating elements 50, 52 and the convection heater 54. The control system 82 may include one or more sensors S arranged in communication with the processor 88 and operable to monitor one or more parameters, for example temperature within the cooking chamber 42.

In an embodiment, when the control panel 80 is deactivated, none of the heating elements 50, 52 or the convection heater 54 is energized. In an exemplary embodiment, the at least one input 84 is operable to select and/or initiate one or more modes of operation of the cooking system 20. Examples of modes of operation of the cooking system 20 include, but are not limited to, toast, bake, broil, grill, warm, reheat, and air fry. Independent control of the heating elements 50, 52 and the convection heater 54 allows a user to configure a cooking/heating cycle based on the type of food item positioned within the cooking chamber 42. In an embodiment, one or more of the cooking modes has a stored sequence of operation of at least one heating element 50, 52 and/or the convection heater 54 associated therewith. Such a stored sequence may be stored within a memory accessible by the processor 88 or may be stored remotely from the cooking system 20 and may be accessed by the processor 88, such as via wireless communication for example. In addition, a user may be able to enter one or more parameters associated with operation of the cooking system 20, such as cooking time, temperature, or toasting color for example, via inputs 84.

The cooking system 20 may be an 1800 W system, and all or a portion of the power drawn by the cooking system 20 may be used to power the one or more heating elements 50, 52 and the convection heater 54. For example, in an embodiment, a small amount of power will be used to operate the user interface 80, a light (not shown), and other supporting electronics, and about 1700 W may be used to power one or more of the heating elements 50, 52 and convection heater 54 during a cooking mode. However, it should be understood that this wattage may vary or fluctuate due to tolerances of the heating elements 50, 52 and the convection heater 54.

The one or more inputs 84 are operable to initiate manual operation of the cooking system 20 in at least a first cooking mode and a second cooking mode. During the first cooking mode, such as a radiative cooking mode for example, at least one of the first heating element 50 and the second heating element 52 is energized to heat the cooking chamber 42 and cook food located therein. During operation in the first cooking mode, the power provided to the at least one heating element 50, 52 and/or the heat generated by the at least one heating element 50, 52 may be constant, or alternatively, may vary during a cooking cycle. Further, in embodiments where both the first and second heating elements 50, 52 are operational, the heat output from the at least one first heating element 50 may be the same, or may be different, than the heat output from the at least one second heating element 52. In the first cooking mode, the convection heating system is not energized.

Operation of the cooking system 20 in the second cooking mode includes performing a convective cooking operation, such as air frying for example. In the second convective cooking mode, the controller 88 operates the convection heater 54 to circulate hot air from the convecting chamber 66 into the cooking chamber 42 (the air flow is generally represented by arrows in FIG. 7).

During operation in the second cooking mode, grease or fat from food positioned within the cooking chamber 42 may drip or splatter onto one or more of the first heating elements 50 or second heating elements 52. To prevent accumulation of such food byproducts on the first heating elements 50 or second heating elements 52, in an embodiment, the first heating elements 50, the second heating elements 52 or a combination of the first heating elements 50 and the second heating elements 52 are intermittently energized, also referred to herein as being pulsed, during the second cooking mode. In such embodiments, when the first and/or second heating elements 50, 52 are energized during the second cooking mode, the convective heating element 56 of the convection heater 54 is not energized, but the air movement device 58 may, but remain active during operation of the first or second heating elements 50, 52. However, in other embodiments, both the convection heating element 56 and the air movement device 58 may be energized, or alternatively, the convective heating element 56, but not the air movement device 58 may be energized.

In an embodiment, the pulsing of the first and/or second heating elements 50, 52 occurs at a calculated time interval within a cooking cycle associated with the second cooking mode. In such embodiments, the time interval may be calculated to prevent an undesirable change in temperature within the cooking chamber 42. For example, the first and/or second heating elements 50, 52 may be energized on average every three minutes during continuous operation of the cooking cycle. However, this average may be based on embodiments where the intervals during which the first and/or second heating elements 50, 52 are energized during a cooking cycle vary, such as after two minutes, and then after another four minutes, and then after another three minutes.

In other embodiments, the pulsing of the first and/or second heating elements 50, 52 may occur in response to a detection of a condition, such as within the cooking chamber 42. As previously described, a sensor S may be operable to monitor one or more parameters within the cooking chamber 42. In an embodiment, the sensor S is operable to monitor the accumulation of food byproduct on a first heating element 50 or second heating element 52. In such embodiments, pulsing of the first and/or second heating elements 50, 52 may be initiated in response to detection by the sensor S that the sensed parameter has reached a predetermined threshold. The time of the pulse, or the length of time during which the first and/or second heating elements 50, 52 are energized, is less than, greater than, or equal to the length of time of the segments of the cooking cycle during which the convective heating element 56 is energized. For example, in embodiments where the convection heater 54 is operated for three minute intervals, the length of time of the pulsing segment or interval may be less than three minutes, such as 60 seconds for example.

Further, during each pulse of the first and/or second heating elements 50, 52, the power provided to at least one of the first and/or second heating elements 50, 52 may be different than the power supplied during operation in the first cooking mode. In an embodiment, one or more of the first and/or second heating elements 50, 52 is operated at a reduced power, such as approximately 50% power for example, when energized during the second cooking mode. However, embodiments where one or more of the first and/or second heating elements 50, 52 is operated at another power level, such as 30%, 40%, 60%, 70%, or any power level between 30% and 70% for example, is within the scope of the disclosure. It should be understood that any power level of the heating elements 50, 52 during a pulse is contemplated herein. In addition, in embodiments where the both the first and second heating elements 50, 52 are energized during a pulse, the first and second heating elements 50, 52 may be energized at the same power level, or alternatively, at different power levels.

Figure 9:
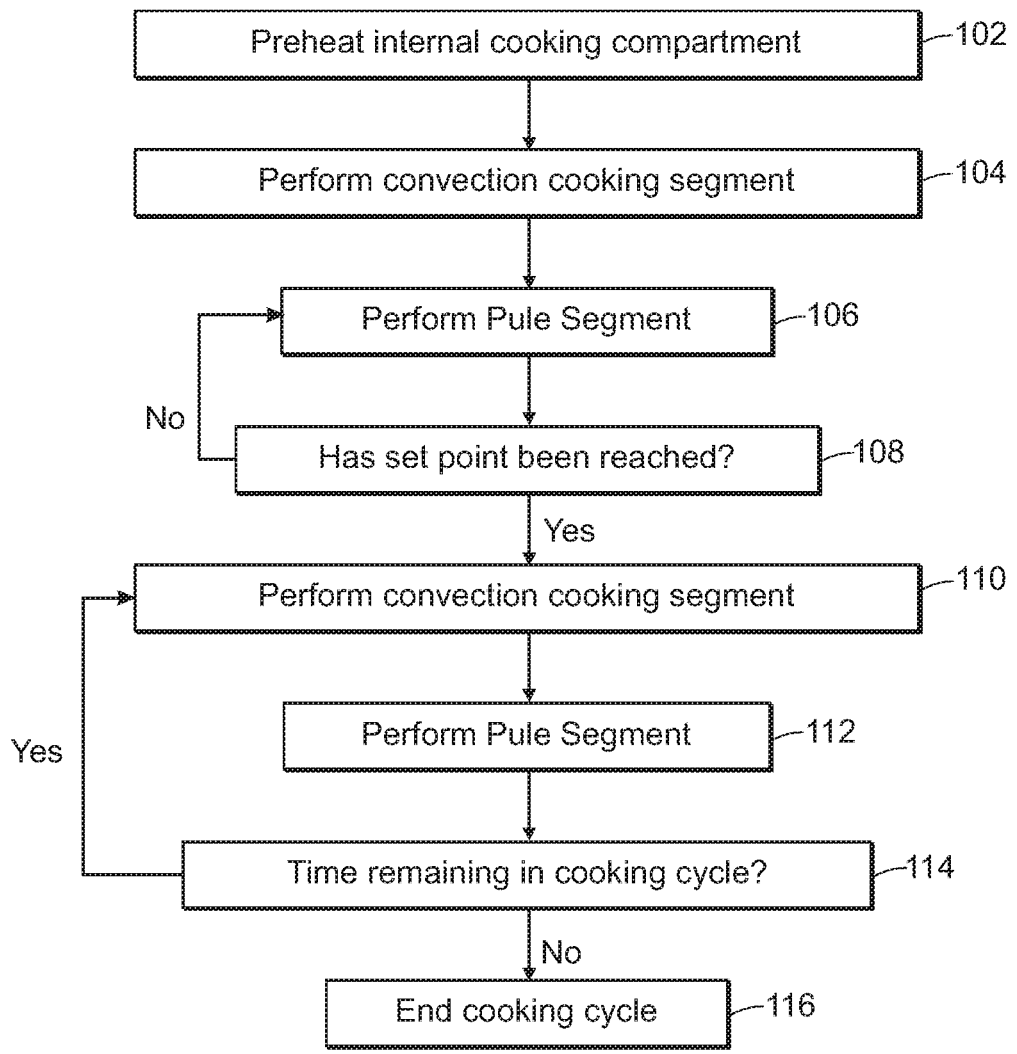
FIG. 9 is a flow diagram of a method of operating the cooking system in a second cooking mode according to an embodiment.

An example of a method 100 of operation of the cooking system 20 in a second cooking mode is illustrated in FIG. 9. As shown in block 102, the cooking chamber 42 is preheated. In an embodiment, this preheating is performed by operating the third heating element at 100% power and driving the air movement device at 100% fan speed for a predetermined period of time, also referred to herein as a preheat interval. Upon completion of the preheat interval, the cooking cycle is initiated. This initiation may occur in response to an input provided by the user to indicate that food has been installed into the internal cooking chamber, or in response to detection that the door 40 of the housing 24 has been opened and closed. To initiate the cooking cycle, as shown in block 104 a desired power is supplied to the convective heating element 56 and the air movement device 58 of the convection heater 54 for a predetermined period of time, also referred to herein as a convection cooking segment. In an embodiment, the power supplied to the convective heating element 56 and the air movement device 58 during a convection cooking segment is reduced compared to the power supplied during the preheat interval. Upon completion of the convection cooking segment, a pulse segment, where the first and/or second heating elements 50, 52 are energized and the convective heating element 56 is de-energized is performed, as shown in block 106.

After completion of the pulse segment 106, the controller 88 will determine if the cooking chamber 42 has reached a predetermined set point temperature associated with operation in the second cooking mode. If the set point temperature has not been reached, a convection cooking segment 104 is initiated until the set point is reached, or the time for the next pulse segment occurs 106. If the set point temperature has been reached, the cooking cycle will transition to a normal cycling that includes alternating between convection cooking segments 110 and pulsing segments 112, as described above, until a total cooking time has elapsed. The cooking system will continue this normal cycling between the convection cooking segments 110 and pulsing segments 112 until determining that the time remaining within the cooking cycle has reached a predetermined value, as shown in block 114, such as one minute remaining for example. It should be understood that the minute described herein as the predetermined value of time remaining is intended as an example only and that any suitable amount of time, such as ninety seconds, two minute, or three minutes for example, are within the scope of the disclosure. Upon determining that the time remaining within the cooking cycle has reached a predetermined value, the cooking cycle will initiate a final pulse segment, shown at block 116. This final pulse segment 116 is initiated regardless of whether the cooking cycle is in the middle of performing a convection cooking segment 110 or a pulse segment 112 when the predetermined amount of remaining time is reached. This final pulse segment is intended to perform a final cleaning operation of the first and/or second heating elements 50,52. The cooking cycle then ends when the final pulse segment 116 is complete. To end the cooking cycle, power is removed from all of the heating elements 50, 52 and the convection heater 54. It should be understood that the method of operating in a second cooking mode including alternating between convection cooking segments and pulse segments is provided as an example only, and that a cooking cycle including any combination of convection cooking segments and pulse segments is within the scope of the disclosure.

Figure 10:
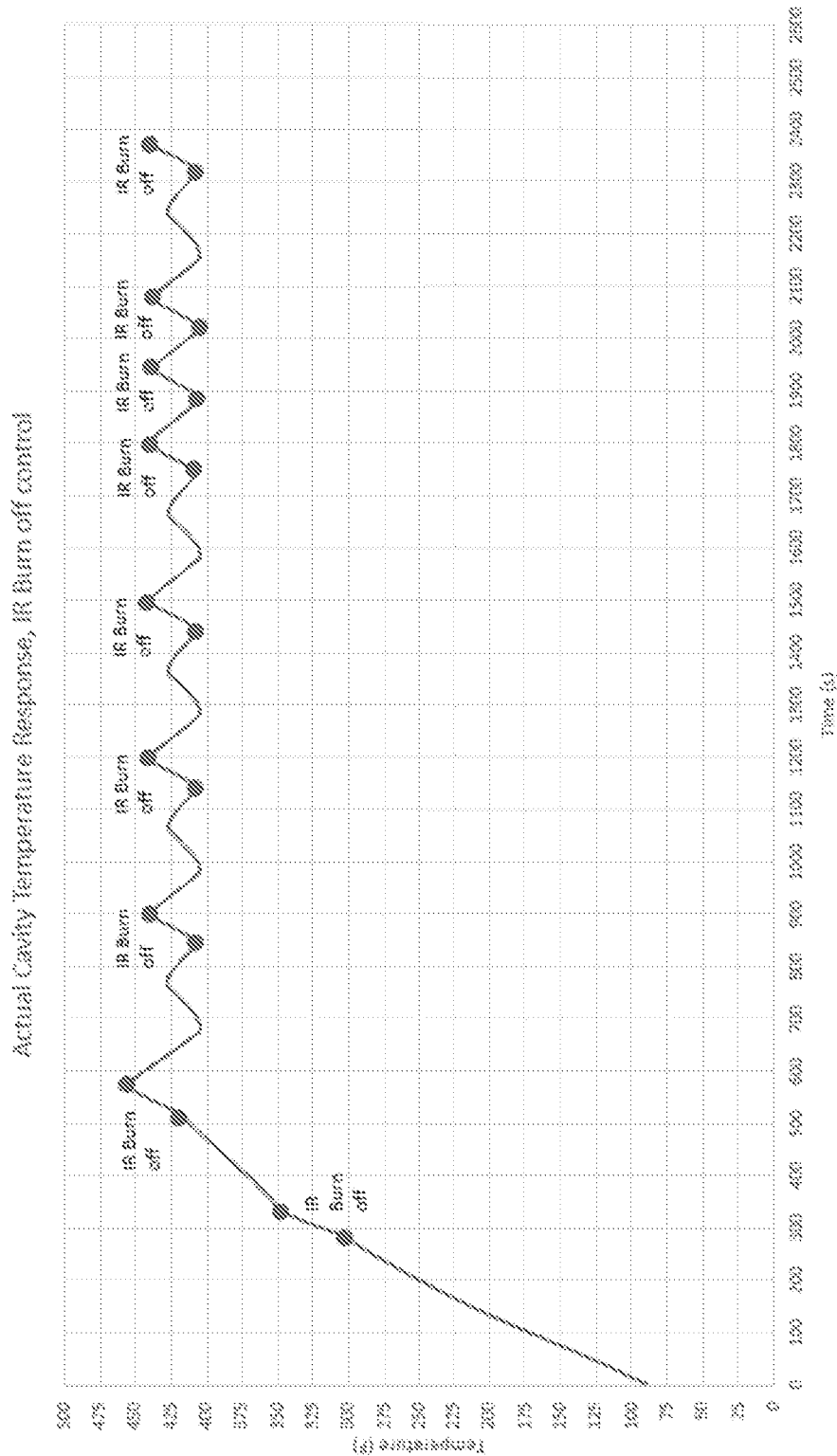
FIG. 10 is a graph of temperature over time within a cooking chamber of the cooking system according to an embodiment.

FIG. 10 illustrates a graph representing an example of the temperature within the cooking chamber over time during operation of the cooking system 20 in the second cooking mode.

Periodic operation or pulsing of the first and/or second heating elements 50, 52 during a second cooking mode cleans the first and/or second heating elements 50, 52 by burning off any food byproducts accumulated therein. As a result, post cook cycle smoke generation can be minimized or even eliminated and the smoke generation that occurs during a cooking cycle is relative imperceptible to the user. In addition, by appropriately timing the periodic removal of the food byproduct, the resulting temperature changes within the cooking chamber 42 are reduced, such that the pulsing has minimal impact on the performance of the cooking system 20 in a second cooking mode.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A cooking system positionable on a support surface, the cooking system comprising:
a housing having a hollow interior including an internal cooking chamber for receiving a food item, the interior of the housing having a ceiling, a floor, and a height extending between the ceiling and the floor;
at least one radiative heating element arranged within the hollow interior and operable to heat the cooking chamber;
a fan shroud mounted within the hollow interior, the fan shroud forming a partition that separates the cooking chamber from a convection chamber, the convection chamber being in fluid communication with the cooking chamber;
an air movement device; and
a convection heater disposed within the convection chamber and operable to heat an air flow moved by the air movement device;
wherein the cooking system is operable in a convection cooking mode, and during the convection cooking mode the at least one radiative heating element is selectively energized;
characterized in that openings are formed within the fan shroud at respective sides of the fan shroud, the openings extending generally over a full height of the fan shroud between the ceiling and the floor of the interior of the housing, and the air movement device is arranged to force the air flow out from the convection chamber through the openings, evenly over the height of the interior of the housing between the ceiling and the floor.

2. The cooking system of claim 1, wherein a cooking cycle of said convection cooking mode includes at least one convection cooking segment during which said convection heater is energized, and at least one pulsing segment during which said at least one radiative heating element is energized.

3. The cooking system of claim 2, wherein said convection heater includes a convective heating element, and during said at least one pulsing segment, said convective heating element is de-energized.

4. The cooking system of claim 2, wherein the convection heater includes a convective heating element, and during the at least one pulsing segment the air movement device is energized, while the convective heating element is de-energized.

5. The cooking system of claim 2, wherein during said at least one pulsing segment, a power provided to said at least one radiative heating element is less than a full power associated with operation of said at least one radiative heating element.

6. The cooking system of claim 5, wherein during the at least one pulsing segment, the at least one radiative heating element is operated at 50% of the full power.

7. The cooking system of claim 2, wherein a time of said at least one pulsing segment is shorter than a time of said at least one convection cooking segment.

8. The cooking system of claim 2, wherein said at least one pulsing segment occurs at a predetermined interval within said cooking cycle.

9. The cooking system of claim 2, wherein said at least one pulsing segment is initiated in response to a detection of a sensed condition.

10. The cooking system of claim 9, wherein said sensed condition includes accumulation of a food byproduct on said at least one radiative heating element.

11. The cooking system of claim 2, wherein a power delivered to the at least one radiative heating element during a pulsing segment is less than a power delivered to the convection heater during the convection cooking segment.

12. The cooking system of claim 2, wherein a time of said pulsing segment is less than a time of said convection cooking segment.

13. The cooking system of claim 12, wherein the convection cooking segment is three times as long as a pulsing segment.

14. The cooking system of claim 1, wherein said at least one radiative heating element includes a first radiative heating element arranged adjacent the ceiling of said cooking chamber and a second radiative heating element arranged adjacent the floor of said cooking chamber.

15. The cooking system of claim 14, wherein during said convection cooking mode, said second radiative heating element is selectively energized to clean said second radiative heating element.

16. The cooking system of claim 14, wherein during said convection cooking mode, both said first radiative heating element and said second radiative heating element are selectively energized to clean said second radiative heating element.

17. The cooking system of claim 1, wherein the cooking system is operable in a radiative cooking mode.

18. The cooking system of claim 17, wherein in the radiative cooking mode, only the at least one radiative heating element is energized.

19. The cooking system of claim 1, wherein the cooking system has a maximum power of 1800 W.

* * * * *